3,275,018
APPARATUS FOR MEASURING AND CONTROLLING THE CONCENTRATION OF ROLLING OIL
William L. Roberts, Murrysville, Pa., assignor to United States Steel Corporation, a corporation of Delaware
Filed Feb. 15, 1963, Ser. No. 258,798
15 Claims. (Cl. 137—88)

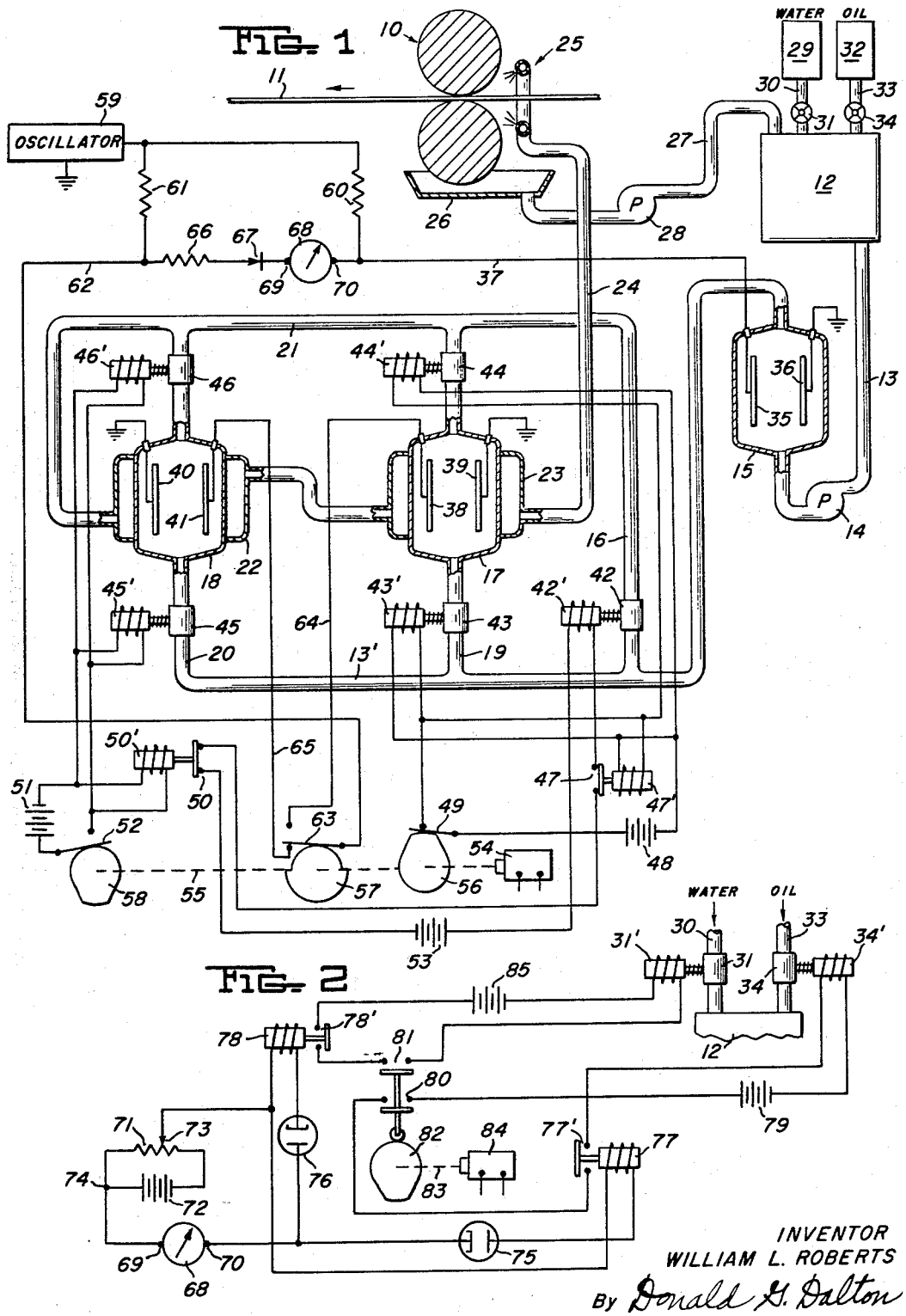

This invention relates to means for determining the concentration of two nonmiscible liquids of substantially different dielectric constants, such as a water-oil mixture and for maintaining the concentration thereof within a predetermined range.

Cold rolling operations in sheet and tin mills require some type of lubricant, usually a water-oil mixture. The oil concentration in a circulating system may be about 5% by volume of a palm oil. Evaporation from the rolls and strip and removal with the strip, deplete the components and require water and oil additions to maintain the concentration of the mixture within a predetermined range.

The dielectric constants of oil and water are substantially different. Whereas a palm oil may have a dielectric constant of about 6.5, the dielectric constant for distilled water is about 65 at about 125° to 150° F., a usual mill system temperature range. Impurities dissolved in the water increase its dielectric constant appreciably. This variation in dielectric constants or more particularly the variation in dielectric constants of a water-oil mixture and of the water alone, can be measured. My invention provides a system therefor including parallel-plate capacitors and a bridge circuit for comparing them. The bridge output is indicated on a calibrated meter as the oil concentration and is used in a control circuit to add oil or water to the mixture.

Accordingly an object of the invention is to provide an arrangement for measuring the concentration of a water-oil mixture and for utilizing the measurement to control the concentration of the mixture within a predetermined range by additions of water or oil thereto.

A more specific object is to provide, in a system for circulating a water-oil mixture, at least two chambers having capacitor elements therein, means for alternately connecting and filling and then isolating one chamber from the system, a bridge circuits connected to include the capacity of the liquid between the elements of one chamber and means effective after a predetermined time to connect the elements of an isolated second chamber in the bridge circuit. The bridge output voltage is a measure of the water-oil concentration of the mixture. In a control means this voltage is opposed by a generated voltage corresponding to a preferred concentration. Opposed rectifiers and relays in turn actuate valves to supply water and oil and thereby maintain the water-oil concentration in the system within a predetermined range.

In accomplishing these and other objects of the invention, I have provided improved details of structure, a preferred form of which is shown in the accompanying drawings. In the drawings:

FIGURE 1 is a diagrammatic view of a lubricant circulating system for a cold rolling mill for strip and of the circuitry constructed in accordance with my invention to measure the concentration of a water-oil mixture;

FIGURE 2 is a diagrammatic view of a portion of the system shown in FIGURE 1 and of the circuitry constructed in accordance with my invention to control additions of water and oil to the mixture.

Turning first to FIGURE 1, a circulating system for a water-oil mixture to a rolling mill 10 for strip 11 comprises a storage tank 12 from which a pipe 13 and pump 14 pump the lubricant through a first chamber 15 and alternately from an inlet header 13' through a bypass pipe 16, or to one of two chambers 17 and 18, through pipes 19, 20 respectively and then to an outlet header 21. The lubricant then flows successively through jackets 22, 23 surrounding chambers 18, 17 respectively and through a pipe 24 to a lubricating means 25 for mill 10. Residual lubricant from the mill that is collected in a sump 26 is pumped to storage tank 12 through a pipe 27 by a pump 28. Additions of water to tank 12 are made from a tank 29 through a pipe 30 by opening a valve 31. Oil additions from a tank 32 flow through a pipe 33 when a valve 34 is opened.

Chamber 15 comprises a cylindrical metal housing, supporting rigidly and by insulating means (not shown), parallel capacitor plates or elements 35, 36, connected through insulated bushings, respectively, to a conductor 37 and to a ground. Second and third chambers 17, 18, employed alternately as reference capacitors are similar to chamber 15, except for jackets 22, 23, respectively, carrying circulating lubricant to insure maintaining the liquid between elements 38, 39 and 40, 41, respectively, at substantially the same temperature as the water-oil mixture circulating between elements 35, 36 of chamber 15. Alternately, the water-oil mixture in chambers 17, 18 must be quiescent for a predetermined time, usually a few minutes, to permit the oil to separate and to rise to the top of the chamber. Thereafter, this chamber may be used as a reference capacitor, since substantially only water is then found between the elements.

To effect the described alternate flow, yet assure continuous flow of the mixture in the circulating system, normally-closed, solenoid-controlled valves are used. Valve 42 is in bypass pipe 16, valves 43, 44, before and after chamber 17 in pipe 19 and valves 45, 46 before and after chamber 18 in pipe 20. For controlling flow through chamber 17, valve solenoids 43', 44' are wired in parallel with a relay 47' having normally-closed contactors 47, in a circuit including a source of potential 48 and a switch 49. For controlling flow through chamber 18, valve solenoids 45', 46' are wired in parallel with a relay 50' having normally-closed contactors 50, in a circuit including a source of potential 51 and a switch 52. Contactors 47, 50 are wired in series in a circuit with valve solenoid 42' and a source of potential 53.

Actuation of the described solenoid-controlled valves and relays is effected by a timer motor 54, the shaft 55 of which has mounted thereon cams 56, 57, 58, spaced with respect to each other, to effect closing and opening of adjacent switches, during successive portions of one revolution of shaft 55. This provides alternate periods of mixture circulation and isolation for chambers 17, 18 and circulation through the bypass 16 when there is no flow through a chamber.

During alternate isolation or quiescent periods, chambers 17, 18 are used as reference capacitors with chamber 15 in an electrical bridge circuit, powered by a grounded oscillator 59, providing a sinusoidal output voltage at a frequency between about 100 and 1000 kilocycles per second. The oscillator is connected to a resistance 60 in series through conductor 37 with the capacity of the circulating water-oil mixture between elements 35, 36 in chamber 15. Oscillator 59 is connected to the other two arms of the bridge comprising in series, a resistance 61, a conductor 62 and a double-throw switch 63, connecting alternately by a conductor 64 with elements 38, 39 of chamber 17 and by a conductor 65 with elements 41, 40 of chamber 18. The bridge proper includes in series a resistor 66, a rectifier 67, and a galvanometer-type meter 68, connected across contacts 69, 70. The meter is precalibrated to read the percent oil by volume in a circulating water-oil mixture.

Resistors 60, 61 are substantially equal and large relative to the reactance of chambers 15, 17 and 18. Hence, the alternating current flowing through the resistors and between the plates in their respective chambers is substantially constant. The presence of dissolved salts and metallic impurities, as well as temperature changes in the water-oil mixture, change the dielectric constant of the mixture. With the described circuit, it can be demonstrated that the accuracy of meter 68 is sensibly independent of small changes in the dielectric constant of the water, caused by the presence of dissolved salts therein. These salts are not soluble in the oil, hence the dielectric constant thereof and the meter reading is not affected. Temperature changes in the described circulating system will be small and of limited effect on the meter. However, where changes in temperature may be greater, it is possible to overcome these effects by including in each of the chambers 15, 17 and 18, substantially similar thermistors (not shown) immersed in the liquid and connected in series between resistances 60, 61 and the respective elements 35, 38 and 41. It may be demonstrated with the described bridge circuit, that the decrease in values of the resistance arms will offset the effect of temperature changes in the dielectric constant of the oil, with resultant limited effect on the meter.

In operation, as shown in FIGURE 1, with timer motor 54 operating, cam 56 closes switch 49 during a portion (about 90°) of each revolution of shaft 55 and opens switch 49 during the remainder of each revolution (about 270°). When switch 49 is closed, solenoids 43′, 44′ are actuated, thereby opening valves 43, 44, respectively, and connecting chamber 17 to the lubricant circulating system. At this time solenoid 47′ is also actuated, opening contactors 47, thereby deenergizing solenoid 42′ and closing valve 42 in bypass 16. When switch 49 is opened, valves 43, 44 are closed and chamber 17 is isolated from the system and provides a quiescent period for the oil to separate from the water. At the same time, contactors 47 close and valve 42 is opened in bypass 16.

Cam 58 is substantially similar to cam 56. However, its high portion is spaced about 180° from that of cam 56. Hence, during a revolution of shaft 55, switches 49 and 52 alternate in closing to operate their respective, substantially similar circuits, to alternate in circulating lubricating mixture through chambers 17, 18. For each cam, the respective switches are open during the remaining 270° of each revolution. During these periods, the respective chambers are isolated from the circulating system. The valve 42 in bypass 16 is open during all times when switches 49, 52 are open.

Cam 57 differs from cams 56, 58 in that its high portion extends for about 180°, rather than about 90° of the circumference. Switch 63 is a double-throw switch. In combination with cam 57, one side of switch 63 is closed during about 180° of one revolution and the other side of switch 63 is closed during the remaining 180° of one revolution of shaft 55. Hence, in the bridge circuit, meter 68 will register oil concentration in the water-oil mixture substantially continuously, since chambers 17, 18 will alternate as reference capacitors after each 180° revolution of shaft 55.

Commencing with the positions shown in FIGURE 1, the next 90° rotation of shaft 55 will find cam 56 closing switch 49 for about 45° and opening it for about 45°. As described above, chamber 17 will have lubricant mixture circulating therethrough for 45° and isolation from the system for 45°, to permit the oil to separate from the water and to ready the chamber as a reference capacitor. Cam 58 will keep switch 52 open and chamber 18 isolated from the system. Cam 57 will keep one side of switch 63 closed to connect oscillator 59, resistor 61 and conductor 62 with conductor 65 and the elements 41, 40 through the water dielectric in chamber 18 to a ground. In the bridge circuit, chamber 18 will be a reference capacitor to chamber 15 and meter 68 will register the oil concentration of the circulating water-oil mixture.

During the subsequent 180° rotation of shaft 55, cam 56 will keep switch 49 open and chamber 17 isolated from the system as it becomes the reference capacitor when cam 57 closes the other side of switch 63 to connect oscillator 59, resistor 61 and conductor 62 through conductor 64 with elements 38, 39 and the water dielectric of chamber 17. As for cam 58, switch 52 will be open and chamber 18 isolated for 45°; switch 52 will be closed with circulation through chamber 18 for the next 90°; switch 52 will be open for about 45°, chamber 18 isolated, quiescent and becoming ready to act as reference capacitor for the subsequent 90° to complete one revolution of shaft 55. The remaining 90° of one revolution of shaft 55 to bring cam 56 to the position shown in FIGURE 1 will comprise 45° of chamber 17 isolation and 45° for circulation of the lubricant therethrough.

Changes may be made in the described apparatus and circuits without departing from the scope of the invention. While it is convenient to have two reference capacitor chambers 17, 18 and to alternate them so as to provide continuous operation of the system, only a single reference chamber 17 need be employed. To effect this change, double-throw switch 63 can be replaced by a switch similar to switches 49, 52, that is closed by the high portion of cam 57. Under these circumstances intermittent operation of the system occurs.

The output of the bridge circuit, as shown on meter 68 may be used to effect additions of water from tank 29 through pipe 30 and valve 31 to tank 12 and oil from tank 32 through pipe 33 and valve 34 to tank 12. Meter 68 may include sensing elements (not shown) at the low, median and high portions of the scale, that in turn actuate a circuit (not shown) to add oil when the oil concentration is low or to actuate a circuit (not shown) to add water when the oil concentration is high.

However, a mill-lubricant circulating system may develop a time lag between the mill metering and control areas. Hence, it is preferred to control from a median or a preferred concentration of the water-oil mixture in combination with a timing means. Turning now to FIGURE 2, the direct-current output voltage of the bridge circuit corresponding to the oil concentration of the mixture appears across contacts 69, 70. A potentiometer 71 including a source of potential 72 and a slider 73 has the slider set to develop a voltage across contact 74 and slider 73 corresponding to a preferred concentration of oil in the system, for example, about 5% by volume of oil. Connecting these opposed voltage sources in a circuit, parallel, opposed rectifiers 75, 76 will then pass current from the higher to the lower potential and also through series-connected relays 77, 78, having normally-open contacts 77′, 78′ respectively. Contacts 77′ are connected in series in a second circuit that includes a source of potential 79, a solenoid 34′ of a normally-closed, solenoid-controlled oil-storage valve 34 and a dual switch 80, 81, actuated by a cam 82, mounted on the shaft 83 of a timer motor 84. Contacts 78′ are connected in series in a third circuit that includes a source of potential 85, a solenoid 31′ of a normally-closed, solenoid-controlled water-storage valve 31 and switch 81.

In operation of the control means, where the oil concentration of the water-oil mixture is too low, the voltage across contacts 69, 70 will be smaller than across slider 73 and contact 74. Current will flow through diode 75 and relay 77. When the current is of sufficient magnitude, corresponding to a predetermined difference from the preferred concentration, the relay 77 will be energized sufficiently to close contacts 77′. However, solenoid 34′ will not be energized and oil-storage valve 34 opened, until switch 80 is closed by cam 82, which in normal operation may be once every ten or fifteen minutes.

Similarly, where the lubricant is too concentrated, the voltage across contacts 69, 70 will exceed the voltage across slider 73 and contact 74. Current will flow through diode 76 and when it becomes of sufficient magnitude, will energize relay 78 and close contacts 78'. The water-storage valve 31 will be opened by solenoid 31' when switch 81 is closed by cam 82.

Changes may be made in the described control apparatus and circuits, without departing from the scope of the invention. The high portion of cam 82 is shown as extending about 90° of the circumference. The volume of the circulating system and other operating factors may affect the optimum volume of oil or water added to a system with each revolution of the cam. Hence, the extent of the high portion of the cam may be changed, as required, for any speed of the timing motor. Likewise, the magnitude of the current required to energize relays 77, 78 may be changed by adjusting the spring tension of a relay, for example. Relay energization may also alternate with a change in current flow. The usual high-level and low-level float switches may be mounted in storage tank 12 and may be included in known manner in the circuits controlling valves 31, 34.

Although I have disclosed herein the preferred apparatus and practice of my invention, I intend to cover as well any change or modification therein which may be made without departing from the spirit and scope of the invention.

I claim:

1. The combination with a system for circulating a quantity of two nonmiscible liquids of substantially different dielectric constants, of a first chamber in said system through which said liquids circulate continuously and having capacitor elements therein, a second chamber having capacitor elements therein, means for alternately connecting said second chamber to said system and isolating it therefrom, a bridge circuit including the capacity of the liquid between the elements of said first chamber, and means successively operating said connecting means first to fill said second chamber with liquid and then isolate it from the system, and means effective a predetermined time after filling and isolation of said second chamber to connect the elements of said second chamber in said bridge circuit.

2. A combination as defined in claim 1 characterized by normally-closed valve means to connect said second chamber to said system and to isolate it therefrom.

3. A combination as defined in claim 2 characterized by a timing means adapted to open and to close said valve means successively.

4. A combination as defined in claim 2 characterized by a bypass around said second chamber and by normally-closed valve means to connect said bypass to said system and to isolate it therefrom.

5. A combination as defined in claim 4 characterized by a timing means adapted alternately to open, while closing said valve means of said second chamber and bypass respectively.

6. A combination as defined in claim 1 characterized by normally-closed, solenoid-operated valves ahead of and behind said second chamber, a circuit including said two solenoids and an on-off switch, a timing motor mounting a cam on its shaft, said cam adapted successively to operate said switch to on and off position.

7. A combination as defined in claim 1 characterized by said bridge circuit including the elements of said second chamber and an on-off switch, a timing motor mounting a cam on its shaft, said cam adapted to close said switch after said second chamber has been isolated from the system for a predetermined time.

8. The combination with a system for circulating a water-oil mixture, of a first chamber in said system through which said liquids circulate continuously and having capacitor elements therein, second and third chambers having capacitor elements therein and a bypass around said second and third chambers, means for alternately connecting said second and third chambers and said bypass to said system and isolating them therefrom, a resistor-capacitor bridge circuit including the capacity of the liquid between the elements of said first chamber, and means successively operating said connecting means to fill said second chamber with liquid, then isolate it from the system and then to fill said third chamber with liquid, then isolate it from the system, and operating said bypass connecting means at times other than the times said second and third chambers are being filled, and means effective a predetermined time after filling and isolation of said second and third chambers from the system to connect the elements of said second and third chambers alternately to said bridge circuit.

9. A combination as defined in claim 1 characterized by storage means for a water-oil mixture in said system, storage means for oil and for water connected thereto by separate pipes and valves, control means for said valves and means responsive to the output of said bridge circuit to operate said control means to add oil and water respectively to said system and thereby to maintain the oil concentration in said water-oil mixture within a predetermined range.

10. A combination as defined in claim 9 characterized by said control means comprising a first circuit including the voltage output of said bridge circuit, a potentiometer developing a voltage opposed thereto and corresponding to a preferred concentration of oil in said system, a pair of opposed rectifiers therebetween, first and second relays connected one to each rectifier, a second circuit including the contacts of said first relay, a source of potential, the control means for said oil storage valve and a first switch adapted to be opened and closed by a timing means, a third circuit including the contacts of said second relay, a source of potential, the control means for said water storage valve and a second switch adapted to be opened and closed by said timing means.

11. Means for controlling the concentration of a material in a mixture where the concentration of said material in said mixture is indicated by means developing a voltage that varies with said concentration, comprising a first circuit including the voltage output of said concentration-indicating means, a potentiometer developing a voltage opposed thereto and corresponding to a preferred concentration, a rectifier therebetween adapted to pass a current when said material concentration falls below said preferred concentration and a relay, a second circuit including the contacts of said relay, a source of potential, control means for adding said material to said mixture and a switch adapted to be opened and closed by a timing device.

12. In an apparatus for determining the relative proportions of two nonmiscible liquids having substantially different dielectric constants circulating as a mixture through a circulating system, the combination with said system of a first means for determining the dielectric constant of said mixture, a second means for determining the dielectric constant of one of said liquids, and electrical means including a pair of capacitors having outputs that vary respectively with said dielectric constants for determining the percentage of the other of said liquids in said mixture.

13. An apparatus as defined in claim 12 characterized by said second means comprising a settling chamber which is filled with said liquids withdrawn from said system and in which said liquids separate gravitationally from each other, and by one of said capacitors comprising a pair of spaced capacitor elements mounted in said chamber in spaced positions in which the capacity thereof is determined by the dielectric constant of one of said liquids.

14. In an apparatus for determining the relative proportions of two nonmiscible liquids having substantially different dielectric constants circulating as a mixture through a circulating system, the combination with said system of a first chamber through which the said mixture of liquids circulates continuously, electrical means including a first capacitor in said chamber having a capacity that varies with the dielectric constant of said mixture, a settling chamber, means for filling said settling chamber with a mixture of said liquids withdrawn from said system, a second electrical capacitor in said settling chamber having a capacity that varies with the dielectric constant of one of said liquids, and electrical circuit means including said first and second capacitors for determining the relative percentage of the other of said liquids in said mixture.

15. In an apparatus for determining the relative proportions of two nonmiscible liquids having substantially different dielectric constants circulating as a mixture through a circulating system, the combination with said system of a first chamber through which the said mixture of liquids circulates continuously, electrical means including a first capacitor in said chamber having a capacity that varies with the dielectric constant of said mixture, a settling chamber, means for filling said settling chamber with a mixture of said liquids withdrawn from said system, a second electrical capacitor in said settling chamber having a capacity that varies with the dielectric constant of one of said liquids, electrical circuit means including said first and second capacitors for determining the relative percentage of the other of said liquids in said mixture, and control means operated by said last-named means for maintaining constant the proportion of said other liquids in said mixture.

References Cited by the Examiner
UNITED STATES PATENTS

| | | | |
|---|---|---|---|
| 2,577,612 | 12/1951 | Fay | 324—61 |
| 2,711,750 | 6/1955 | Norcross | 137—92 |
| 2,807,956 | 10/1957 | Doble | 324—61 X |

WILLIAM F. O'DEA, *Primary Examiner.*

J. O'NEILL, CLARENCE R. GORDON,
*Assistant Examiners.*